(12) United States Patent
Bean et al.

(10) Patent No.: US 7,105,794 B2
(45) Date of Patent: Sep. 12, 2006

(54) PHOTOELECTRIC IMAGING SENSOR AND METHOD HAVING A METALLIZED PLATE CAPACITIVELY COUPLED TO AN ELECTRON EMITTING PLATE

(75) Inventors: Heather N. Bean, Fort Collins, CO (US); Mark N. Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 10/919,715

(22) Filed: Aug. 17, 2004

(65) Prior Publication Data

US 2006/0038110 A1 Feb. 23, 2006

(51) Int. Cl.
*H01L 27/00* (2006.01)
(52) U.S. Cl. ............................ 250/208.1; 250/214 R
(58) Field of Classification Search ............ 250/208.1, 250/214 R
See application file for complete search history.

(56) References Cited

U.S. PATENT DOCUMENTS 6,897,620 B1 * 5/2005 Takeuchi et al. ......... 315/169.3

* cited by examiner

*Primary Examiner*—Que T. Le

(57) ABSTRACT

A photoelectric imaging sensor and method that provide for electronic shuttering and frequency filtering. An exemplary sensor includes a biased conductive frame disposed adjacent to an electron emitting plate that is coupled by way of a reset field effect transistor to ground. A metallized plate is insulated from (capacitively coupled to) the electron emitting plate and is coupled by way of a charge isolation field effect transistor (to ground. Electronic shuttering and frequency filtering in the photoelectric imaging sensor is implemented is as follows. The conductive frame is biased by predetermined amounts to control the surface work function of the electron emitting plate and set the incident light frequency at which photoelectrons are emitted by the electron emitting plate, thus providing for frequency filtering and electronically shuttering of the photoelectric imaging sensor. Electronic shuttering is provided by gating the metallized plate using the charge isolation field effect transistor.

4 Claims, 2 Drawing Sheets

PHOTOELECTRIC IMAGING SENSOR AND METHOD HAVING A METALLIZED PLATE CAPACITIVELY COUPLED TO AN ELECTRON EMITTING PLATE

TECHNICAL FIELD

The present invention relates generally to photoelectric imaging sensors and methods, and more specifically, to an improved photoelectric imaging sensor and method that provide for electronic shuttering and frequency filtering.

BACKGROUND

One of the weaknesses of CCD (charge coupled device) technology is the inability to electrically discontinue charge generation and accumulation. As a result, prior art imaging sensors have had limited on-chip frequency filtering capabilities. Also, electronic shuttering has not been possible on-chip.

It is an objective of the present invention to provide for a photoelectric imaging sensor structured to electrically discontinue charge generation and accumulation thus permitting electronic shuttering, and also on-chip frequency filtering. It is also an objective of the present invention to provide for a method for use of a photoelectric imaging sensor that implements electronic shuttering and frequency filtering.

SUMMARY OF THE INVENTION

To accomplish the above and other objectives, the present invention provides for a photoelectric imaging sensor that permits frequency filtering and electronic shuttering. An exemplary photoelectric imaging sensor comprises a biased conductive frame or screen that is disposed adjacent to an electron emitting substance or plate. The electron emitting plate is gated to ground by a reset field effect transistor that, when conducting, restores charge neutrality to the plate.

A metallized substrate or plate is disposed adjacent to the electron emitting plate and is separated therefrom by an insulating layer, such as oxide, for example. The metallized plate is thus capacitively coupled to the electron emitting plate. The metallized plate is coupled by way of a charge isolation field effect transistor (FET) to ground.

The present invention also provides for a method that implements electronic shuttering and frequency filtering in a photoelectric imaging sensor. An exemplary method is as follows.

A photoelectric imaging sensor is provided that comprises a biased conductive frame disposed adjacent to an electron emitting plate that is coupled by way of a reset field effect transistor to ground, and a metallized plate separated from the electron emitting plate by an insulating layer and that is coupled by way of a charge isolation field effect transistor to ground.

The conductive frame is biased at a user determined voltage to alter the effective work function of the electron emitting plate. This provides a low frequency limit to the photons energetic enough to eject electrons that will overcome the frame bias and be collected by the bias frame. These captured electrons will leave he emitting plate charged (reset FET conducting) and this charge is mirrored on the insulated plate as long as the charge isolation FET is conducting. Turning off the charge isolation FET traps a replica of the charge lost by the emitting plate to the bias fame and effectively electrically shutters the sensor. The voltage on the insulated plate may now be read from the sensor.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1:
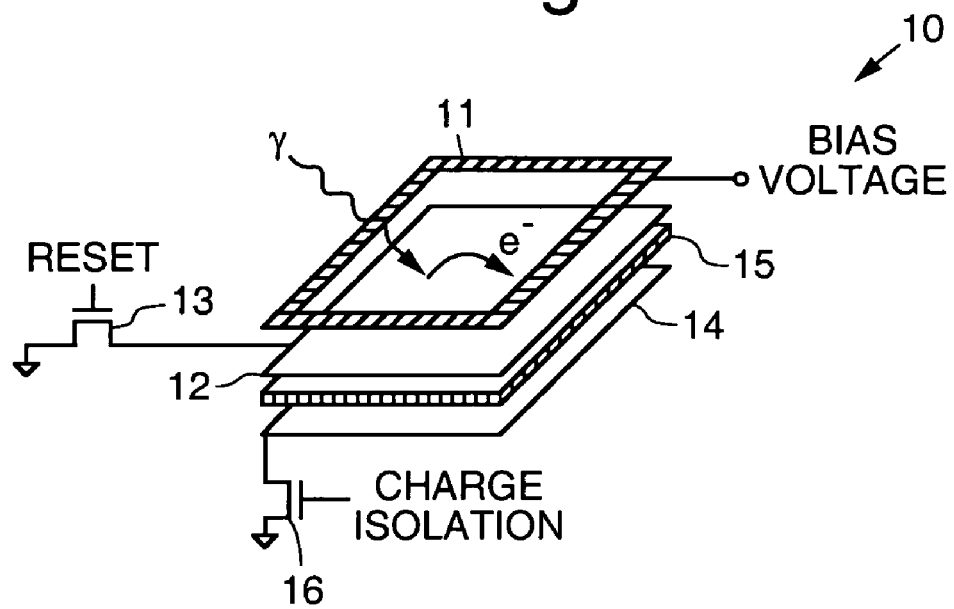
FIG. 1 illustrates an exemplary embodiment of a photoelectric imaging sensor in accordance with the principles of the present invention.
Figure 2:
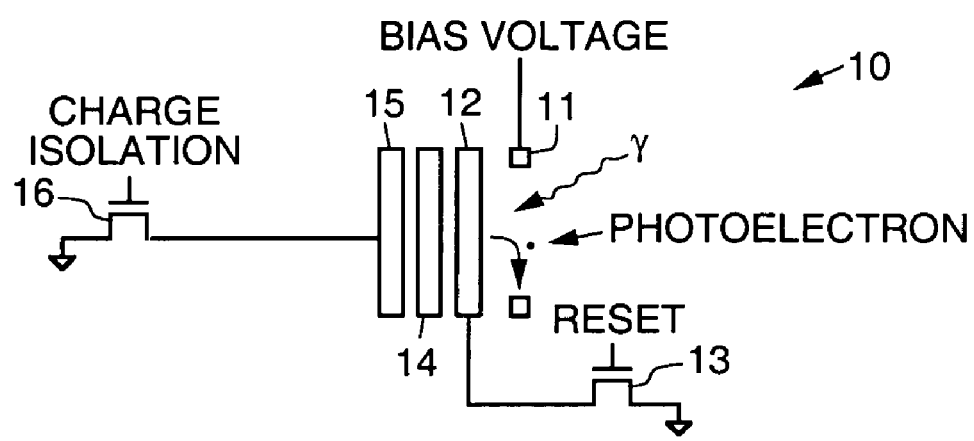
FIG. 2 is a schematic diagram of the exemplary photoelectric imaging sensor shown in FIG. 1.

Referring to the drawing figures, FIG. 1 illustrates an exemplary embodiment of a photoelectric imaging sensor 10 in accordance with the principles of the present invention. FIG. 2 is a schematic diagram of the exemplary photoelectric imaging sensor 10.

The exemplary photoelectric imaging sensor 10 comprises a biased conductive frame 11 or screen 11 that is disposed adjacent to an electron emitting substance 12 or plate 12. The frame 11 may be constructed using conventional metalization processes. The electron emitting plate 12 is coupled by way of a reset field effect transistor (FET) 13, providing a charge equalization or reset to ground.

A metallized substrate 14 or plate 14 is disposed adjacent to the electron emitting plate 12 and is separated therefrom by an insulating layer 15, such as oxide, for example. The metallized plate 14 is thus capacitively coupled to the electron emitting plate 12. The metallized plate 14 is coupled by way of a field effect transistor (FET) 16 to ground. Turning off the field effect transistor (FET) 16 provides charge isolation of the plate 14.

Operation of the exemplary photoelectric imaging sensor 10 is as follows. A photon strikes the electron emitting plate 12 and emits a photoelectron that is captured by the biased conductive frame 11. The metallized plate 14 that lies beneath and is insulated from the electron emitting plate 12 is capacitively coupled to the electron emitting plate 12. Current flows through the charge isolation FET 16 to maintain charge neutrality. This charge may then e shuttered or isolated by the charge isolation FET 16.

Figure 3:
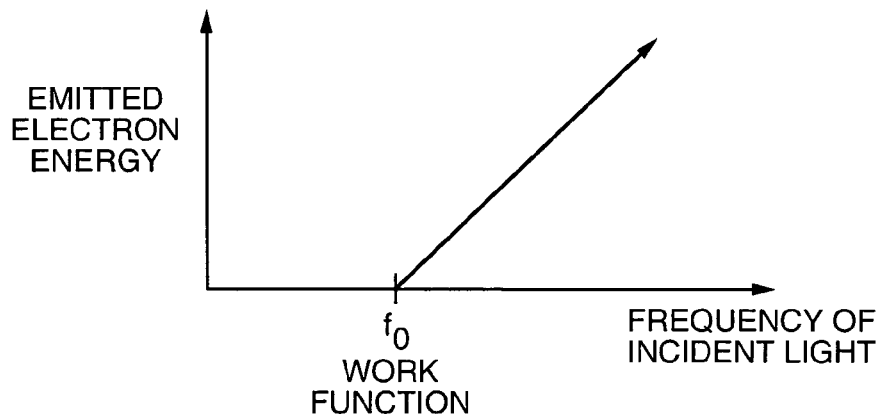
FIG. 3 is a graph showing an exemplary work function of the exemplary photoelectric imaging sensor.

Biasing the conductive frame 11 effectively changes the surface work function of the electron emitting plate 12. The work function is the minimum photon energy required for electron emission. FIG. 3 is a graph showing an exemplary work function associated with the electron emitting plate 12.

Changing the bias applied to the biased conductive frame 11 alters the minimum frequency of incident light at which photoelectrons are emitted from the electron emitting plate 12 and captured by the bias frame 11. Consequently, this permits frequency filtering of the light that is recorded by the photoelectric imaging sensor 10.

For example, increasing the negative bias on the conductive frame 11 requires an increased photoelectron energy for collection by the conducting frame 11. This means that the photon cutoff frequency $f_0$ is also increased. Thus, the present photoelectric imaging sensor 10 can be electrically shuttered by turning off the charge isolation FET 16. The photoelectric imaging sensor 10 responds to the number of incident photons and not the total energy of the incident light.

Thus, the present photoelectric imaging sensor 10 can be electronically shuttered on and off by controlling the bias applied to the conductive frame 11 or screen 11. The photoelectric imaging sensor 10 responds to numbers of photons incident thereupon, not to $I^2R$ energy.

Figure 4:
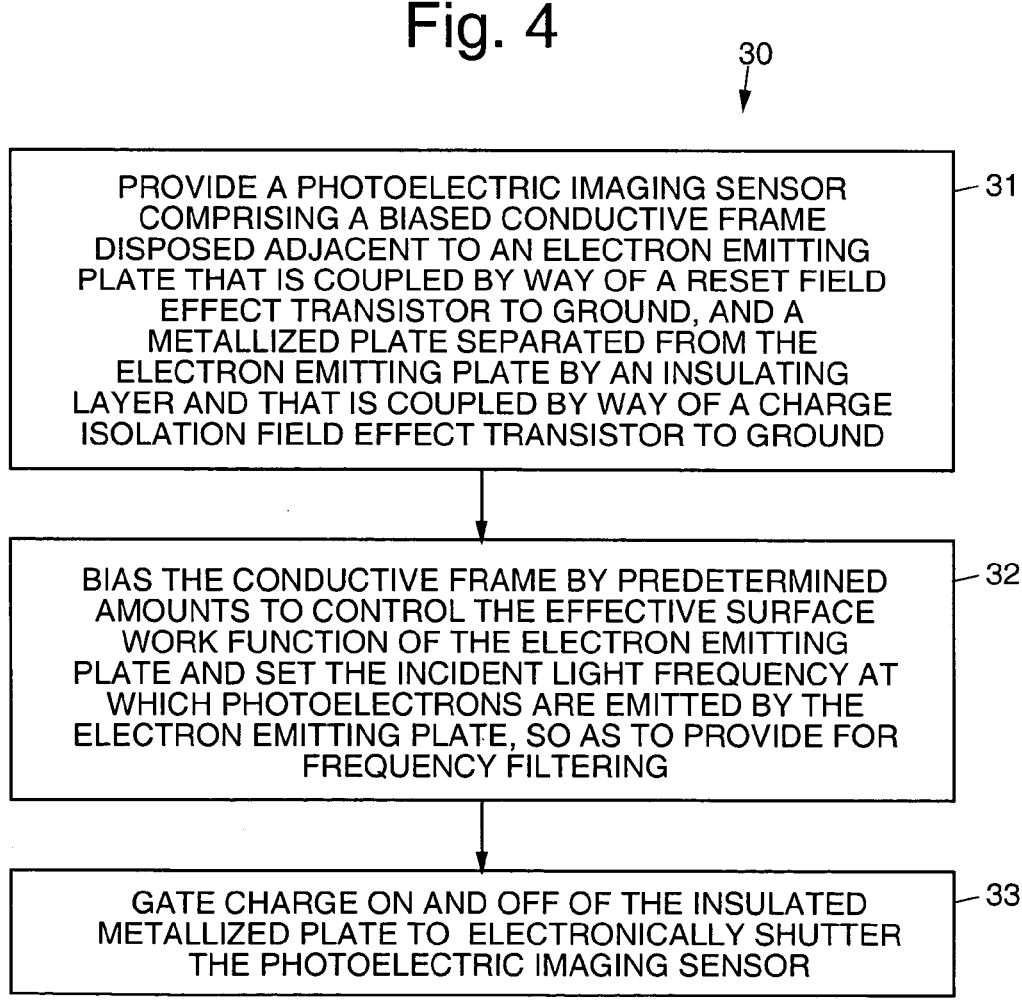
FIG. 4 is a flow diagram illustrating an exemplary method in accordance with the principles of the present invention.

FIG. 4 is a flow diagram illustrating an exemplary method 30 in accordance with the principles of the present invention. The exemplary method 30 comprises the following steps.

A photoelectric imaging sensor 10 is provided 31 that comprises a biased conductive frame 11 disposed adjacent to an electron emitting plate 12 that is coupled by way of a reset field effect transistor 13 to ground, and a metallized plate 14 separated from the electron emitting plate 12 by an insulating layer 15 and that is coupled by way of a charge isolation field effect transistor (FET) 16 to ground.

The conductive frame 11 is biased 32 by predetermined amounts to control the effective surface work function of the electron emitting plate 12 and set the incident light frequency at which photoelectrons are emitted by the electron emitting plate 12. Electronic shuttering of the photoelectric imaging sensor 10 is provided by gating charge on an off of the metallized plate 14 using the charge isolation FET 16.

Thus, an improved photoelectric imaging sensor and method that provide for electronic shuttering and frequency filtering have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A photoelectric imaging sensor comprising:
   a biased conductive frame;
   an electron emitting plate disposed adjacent to the biased conductive frame and coupled by way of a reset field effect transistor to ground;
   a metallized plate disposed adjacent to and separated from the electron emitting plate by an insulating layer such that it is capacitively coupled to the electron emitting plate; and
   a charge isolation field effect transistor coupled between the metallized plate to ground.

2. The sensor recited in claim 1 wherein the insulating layer comprises an oxide.

3. The sensor recited in claim 1 whereby controlling the amount of bias applied to the biased conductive frame controls the frequency of incident light at which photoelectrons are emitted from the electron emitting plate, thus providing for frequency filtering of the light that is incident upon the photoelectric imaging sensor.

4. A method comprising;
   providing a photoelectric imaging sensor comprising a biased conductive frame disposed adjacent to an electron emitting plate that is coupled by way of a reset field effect transistor to ground, and a metallized plate separated from the electron emitting plate by an insulating layer and that is coupled by way of a charge isolation field effect transistor to ground;
   biasing the conductive frame by predetermined amounts to control the effective surface work function of the electron emitting plate and set the incident light frequency at which photoelectrons are emitted by the electron emitting plate, so as to provide for frequency filtering and electronically shuttering of the photoelectric imaging sensor; and
   gating charge on and off of the metallized plate to provide electronic shuttering.

* * * * *